US012762345B2

(12) United States Patent
Staashevsky et al.

(10) Patent No.: US 12,762,345 B2
(45) Date of Patent: Oct. 13, 2026

(54) ENTITY UNDERSTANDING AND RESOLUTION SYSTEM

(71) Applicant: FETCH REWARDS, LLC, Madison, WI (US)

(72) Inventors: Alec Gil Stashevsky, Los Angeles, CA (US); Melanie Anne Riley, Madison, WI (US); Peter Colin Campbell, Madison, WI (US)

(73) Assignee: Fetch Rewards, LLC, Chicago, IL (US)

( * ) Notice: Subject to any disclaimer, the term of this patent is extended or adjusted under 35 U.S.C. 154(b) by 138 days.

(21) Appl. No.: 18/957,312

(22) Filed: Nov. 22, 2024

(65) Prior Publication Data

US 2026/0148001 A1 May 28, 2026

(51) Int. Cl.

| | |
|---|---|
| ***G06F 40/00*** | (2020.01) |
| ***G06F 16/31*** | (2019.01) |
| ***G06F 40/295*** | (2020.01) |
| ***G06F 40/30*** | (2020.01) |

(52) U.S. Cl.

CPC .......... *G06F 40/295* (2020.01); *G06F 16/316* (2019.01); *G06F 40/30* (2020.01)

(58) Field of Classification Search

CPC ........... G10L 15/1822; G10L 2015/088; G10L 15/063; G10L 15/26; G10L 15/16; G10L 2015/228; G10L 15/02; G10L 15/193; G10L 15/197; G06F 40/30; G06F 40/295; G06F 16/90332; G06F 40/279; G06F 2218/08; G06F 3/04842; G06F 2218/12; G06F 2209/503; G06F 40/284; G06F 40/56; G06N 3/045; G06N 20/00; G06N 3/0464; G06N 3/0475; G06N 3/09; G06N 3/091; G06N 3/092; G06N 3/094; G06N 3/096; G06N 3/098; G06N 3/0985; G06N 20/10; G06N 20/20; G06V 30/1448

See application file for complete search history.

(56) References Cited

U.S. PATENT DOCUMENTS

| | | | | |
|---|---|---|---|---|
| 11,593,556 | B2 * | 2/2023 | Shrivastava | G10L 25/48 |
| 12,373,893 | B2 * | 7/2025 | Nguyen | G06F 16/3329 |
| 12,455,905 | B1 * | 10/2025 | Swamy | G06F 16/316 |
| 2021/0374338 | A1 * | 12/2021 | Shrivastava | G06F 40/30 |

(Continued)

OTHER PUBLICATIONS

Li, Jing, et al. "A survey on deep learning for named entity recognition." IEEE transactions on knowledge and data engineering 34.1 (2020): 50-70. (Year: 2020).*

(Continued)

*Primary Examiner* — Edgar X Guerra-Erazo

(74) *Attorney, Agent, or Firm* — Barnes & Thornburg LLP

(57) ABSTRACT

Technologies for machine learning-based entity understanding and resolution are disclosed. Data for training an entity resolution model is collected to learn semantic relationships associated with entity names. The entity names are provided in a domain of documents that follow the semantic conventions differently from natural language semantic conventions. The data includes entries each specifying an entity name and a label. The entity resolution model is trained using the data to learn and generalizes the semantic relationships and is deployed to serve requests for resolving an entity name from text extract from a document image.

20 Claims, 10 Drawing Sheets

(56) References Cited

U.S. PATENT DOCUMENTS

| | | | | |
|---|---|---|---|---|
| 2023/0004587 | A1* | 1/2023 | Nguyen | G06F 16/3329 |
| 2023/0005070 | A1* | 1/2023 | Nguyen | G06F 16/3329 |
| 2025/0238852 | A1* | 7/2025 | Srinivasan | G06Q 30/0641 |
| 2025/0245445 | A1* | 7/2025 | Hitesh | G06F 40/295 |

OTHER PUBLICATIONS

Melz, Eric. "Understanding Scanned Receipts." arXiv preprint arXiv:2005.01828 (2020). (Year: 2020).*

Huang, Yupan, et al. "Layoutlmv3: Pre-training for document ai with unified text and image masking." Proceedings of the 30th ACM international conference on multimedia. 2022. (Year: 2022).*

Kuanyshkereyev, Farkhad. "A Flexible and Efficient Approach for Key Information Extraction." (2023). (Year: 2023).*

Malkov, Yu A. et al., "Efficient and Robust Approximate Nearest Neighbor Search Using Hierarchical Navigable Small World Graphs", IEEE Transactions on Pattern Analysis and Machine Intelligence, vol. 42, No. 4, Apr. 2020, pp. 824-836.

Mosqueira-Rey, Eduardo et al., "Human-in-the-loop machine learning: a state ofthe art", Artificial Intelligence Review (2023) 56:3005-3054, 50 pages.

Peeters, Ralph et al., "Intermediate Training of BERT for Product Matching", DI2KG, Aug. 31, 2020, 5 pages.

Reimers, Nils et al., "Sentence-BERT: Sentence Embeddings using Siamese BERT-Networks", Proceedings of the 2019 Conference on Empirical Methods in Natural Language Processing and the 9th International Joint Conference on Natural Language Processing, pp. 3982-3992.

* cited by examiner

1000

ENTITY UNDERSTANDING AND RESOLUTION SYSTEM

FIELD

Embodiments disclosed herein generally relate to improvements in entity resolution, and more specifically, to machine learning-based techniques for learning semantics and conventions associated with a given domain for entity resolution.

BACKGROUND

In natural language processing (NLP), entity resolution pertains to identifying references in a given text to a specific entity and mapping those references to that entity. Entity resolution has specific uses in a variety of fields, such as search and information retrieval, social media, and e-commerce. For instance, in the e-commerce setting, NLP models may be used on text extracted from physical receipts associated with a retailer to segment and categorize relevant portions of a given receipt, such as text corresponding to retailer name, address, store identifier, phone number, items purchased, and the like. Entity resolution techniques may thereafter be applied to text corresponding to the retailer name to identify the specific retailer associated with the receipt.

However, certain domains, such as the exemplary domain of receipts, have a variety of unique characteristics that render conventional entity resolution models inadequate in accurately matching raw text with an originating merchant. Particularly, receipts are a type of visually-rich document that leverage layout, type space, font, and other non-lexical mechanisms to convey meaning. Further, because physical receipts typically have limited space to convey meaning, textual components of a given receipt may be shortened, abbreviated, and/or represented under varying and diverse conventions to efficiently communicate the meaning. By contrast, conventional machine learning models used for entity resolution tasks are generally trained on natural language, prose, and otherwise common domains in artificial intelligence and machine learning (e.g., in NLP, semantic search, machine translation, etc.). For example, a conventional pre-trained model may learn that words like "BBQ" and "GRILL" are similar and used interchangeably in the context of natural language. However, in the context of retailer receipts, "GUS'S BBQ" and "GUS'S GRILL" might pertain to two distinct merchants but may nevertheless be identified as semantically similar with the aforementioned pre-trained model. Thus, preexisting approaches towards entity resolution in domains involving visually-rich documents are potentially imprecise and error prone.

SUMMARY

One embodiment presented herein discloses a method for matching text input to a retailer entity name in a receipt. The method generally includes collecting data for training an entity resolution model to learn semantic relationships associated with entity names provided in a domain of retailer receipts. The entity resolution model is initially trained on a first domain. The data for training the entity resolution model includes entries, each entry specifying at least a retailer entity name and a label describing a measure associated with the retailer entity name. The method also generally includes building the entity resolution model using the collected data by performing a supervised learning technique to adapt the entity resolution model to learn and generalize the semantic relationships. The entity resolution model is deployed to serve requests for resolving an entity name from text extracted from a retailer receipt, and an active learning interface is provided to refine the entity resolution model.

Another embodiment presented herein discloses a method for matching text input to an entity name in a document image. The method generally includes collecting data for training an entity resolution model to learn semantic relationships associated with entity names provided in a domain of documents. The domain of documents follow semantic conventions that are different from natural language semantic conventions. The data for training the entity resolution model includes entries, each entry specifying at least an entity name and a label describing a measure associated with the entity name. The entity resolution model is trained using the collected data to learn and generalize the semantic relationships. The entity resolution model is deployed to serve requests for resolving an entity name from text extracted from a document image.

Yet another embodiment presented herein discloses a system having one or more processors and a memory storing instructions. When executed by the one or more processors, the system performs an operation for matching text input to an entity name in a document image. The operation generally includes collecting data for training an entity resolution model to learn semantic relationships associated with entity names provided in a domain of documents. The domain of documents follow semantic conventions differently from natural language semantic conventions. The data for training the entity resolution model includes entries, each entry specifying at least an entity name and a label describing a measure associated with the entity name. The entity resolution model is trained using the collected data to learn and generalize the semantic relationships. The entity resolution model is deployed to serve requests for resolving an entity name from text extracted from a document image.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
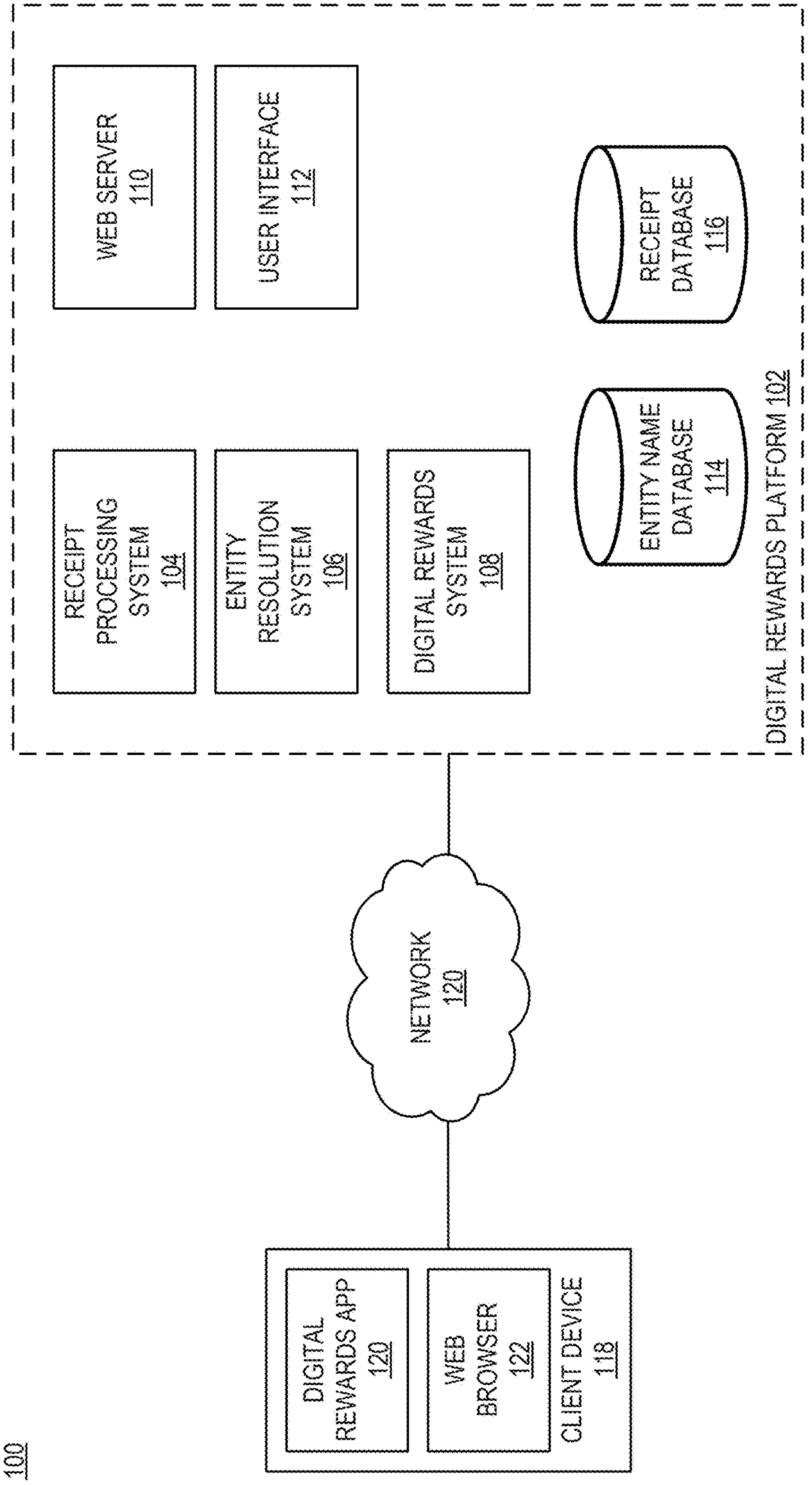
FIG. 1 illustrates an example computing environment for entity understanding and resolution in a digital rewards platform.

As noted, conventional machine learning techniques are insufficient for precisely matching raw text (e.g., from a retailer receipt) to a specific entity name (e.g., an underlying merchant associated with the receipt). For instance, high-dimensional sparse vectorization techniques such as Bag-of-Words (e.g., BM25), Term Frequency-Inverse Document Frequency, and n-Grams merely evaluate lexical features (e.g., word counts, word presence) and are unable to account for semantic relationships and conventions associated with receipts, and moreover are susceptible to failure in the event of optical character recognition (OCR) error (e.g., caused by noise inherent to the OCR process). As another example, pre-trained sentence transformers and large language models (LLMs), while effective in capturing semantic meaning of words, are primarily trained on domains of natural language, with LLMs requiring significantly more computing power. Therefore, such techniques are trained to learn and evaluate text using understood semantic natural language conventions and not towards specific semantics and conventions associated with receipts. Preexisting domain adaptation approaches towards training, fine-tuning, and optimizing models towards a domain as nuanced as receipts, which possess unique characteristics distinguishable from conventional text domains, are inefficient given the quality of datasets that fail to capture the conventions and semantics associated with receipts and also fail to adequately account for the aforementioned issues caused by OCR processing of physical receipt images. In addition, the diversity and distribution of data for performance optimization of a domain adapted model is complex and requires careful crafting of training data. Further, using a domain adaptation approach is impractical for certain types of models, such as LLMs, which, given the immense size of the models, are computationally intensive to train and deploy for serving desired data.

To address these issues, embodiments presented herein disclose improvements in artificial intelligence (AI) and machine learning (ML)-based technologies for entity understanding and resolution, specifically in domains that incorporate visually-rich documents such as receipts. More particularly, an AI/ML-based software system architecture is provided to reconfigure pretrained models to learn receipt semantic relationships and conventions based on supervised learning on data which incorporates at least historically obtained and processed receipt data. Doing so provides accurate ground truth data for identifying common semantics and conventions generally associated with receipts as well as a canonical source of preexisting retailer entity names, as well as enables the model to understand an error profile of upstream OCR processes to learn and account for mistakes caused by such processes. A search index may also be generated based on outputs provided by the model to ensure fast retrieval in subsequent use of the model. The model and search index may thereafter be deployed for use to precisely identify a given retailer entity name from text input from a receipt.

For example, the embodiments of the present disclosure may be implemented as part of a software microservice architecture of a digital rewards platform that incentivizes customers to upload images of receipts of their purchases in exchange for points which can be spent on rewards such as gift cards, sweepstakes entries, and charitable donations. The platform may include software processes for extracting text data from the receipt images for further processing and map the text data to expected categories, such as entity name, address, items purchased, and the like. In such a platform, it is important to ensure that the appropriate retailer entity is accurately identified in a given receipt to ensure that a given purchase is credited towards that retailer on behalf of the customer for a variety of reasons in addition to ensuring an accurate accounting. For example, a customer may be enticed to purchase goods at a retailer's store because the platform has partnered with the retailer and launched a promotion that rewards the customer with a given points multiplier on a dollar amount of purchases. However, if the purchase receipt is credited to a different retailer due to error in entity resolution, the customer might not receive a desired amount of points, and thus the overall user experience would degrade. Further, in such a case, the retailer may also be less inclined to partner with the platform for subsequent promotions in light of such errors. To ensure that receipts are accurately interpreted, as further described herein, the platform may include processes to build an entity resolution model using, among other data, canonical retailer data previously evaluated and verified retailer names and associated receipt data. In addition to providing a canonical source of retailer names, such data can be used to create an OCR error profile from scanning issues during the initial OCR process. Once trained, the model can process subsequent text data from receipts to match, with an improved accuracy, the receipt to a specific retailer stored in a platform database.

Further, in some embodiments, the techniques described above may incorporate an active learning-based human-in-the-loop interface to refine or reinforce outputs, such as to account for scenarios in which the model lacks confidence (e.g., based on objective scoring). The human-in-the-loop interface enables an additional layer for assessing accuracy of outputs and also identifying whether a given input corresponds to an entity that was not previously known by the model or included in the platform database. The interface may interact with the model in real-time as an evaluator inputs a proposed correct entity name (e.g., in response to an incorrect output due to some error in OCR processing). For example, the interface may include a search-as-you-type feature to identify, using the model, whether the text entered matches a known variant of a canonical retailer entity, and present the canonical retailer entity identified by the model as a suggestion for entry. Doing so enables augmentation of the platform database and further training of the model.

Compared to previous approaches towards entity resolution, the technologies disclosed herein impart, to a model, specific local knowledge associated with a given domain, such as receipts, to orders of magnitude smaller (e.g., tens to hundreds of millions of parameters) than models such as LLMs (e.g., which are typically on the order of billions to hundreds of billions of parameters). As a result, training, deploying, and executing the model of the present disclosure requires significantly less computing resources and also allows for less costly and more improved performance for real-time online inference workloads that are critical in providing a reliable user experience. Additionally, the models of the present disclosure require significantly less training data to learn semantics and conventions associated with a specific domain such as receipts, which also provides computational efficiency and cost reduction.

Further, in addition to improving accuracy and computational efficiency in entity resolution, the models of the present disclosure are trained to account for OCR errors by learning such errors caused by OCR through the inclusion of data incorporating such errors (e.g., which may originate from local OCR processes on the platform) in the training data set. Through the error profile, the entity resolution models described herein may learn error patterns (e.g., common character deletions, additions, and substitutions in OCR-processed text) and thereby learn previously unexpected relationships between a given mis-scanned word relative to other words, as will further be described herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Note, the following uses a digital rewards platform that extracts and evaluates text from scanned images of receipts to predict a corresponding retailer entity name as a reference example for machine learning-based entity understanding and resolution in a domain that is subject to semantics and conventions that differ from traditional natural language semantics and conventions. However, one of skill in the art will recognize that embodiments of the present disclosure may be adapted to a variety of domains that possess unique characteristics distinguishable from such traditional natural language semantics and conventions. For example, embodiments may be adapted to systems that evaluate entities in event tickets, betting slips, identification documents, travel documents, financial documents, and so on, for the purpose of identifying a mapping between text in those documents to a specific entity.

Referring now to FIG. 1, a computing environment 100 in which a digital rewards platform 102 configured to train, deploy, and execute an AI/ML-based entity resolution model is shown. Illustratively, the computing environment 100 includes the digital rewards platform 102 and a client device 118, each interconnected with a network 120 (e.g., the Internet, a local area network, wide area network, etc.).

The illustrative digital rewards platform 102 represents computing systems and processes of an entity that issues digital rewards (e.g., points, goods, services, etc.) to its users in response to certain user interactions with the platform 102, such as by uploading receipts to the platform 102 from a client device 118 (e.g., a smartphone, tablet device, desktop computer, laptop computer, cloud computing instance, and so on) of the user. To that end, the digital rewards platform 102 may include a receipt processing system 104, entity resolution system 106, a digital rewards system 108, a web server 110, a user interface 112, entity name database 114, and receipt database 116. A user may access the digital rewards platform 102 via an application executing on the client device 118, such as a digital rewards app 120 configured to communicate with the digital rewards platform 102 through various application programming interface (API) calls and provide a graphical user interface displaying web content transmitted by the web server 110 of the platform, or through a web browser 122 configured to communicate with the web server 110. The web server 110 enables communication between the digital rewards app 120 (or web browser 122) of the client device 118 and other components of the digital rewards platform 102. For example, the web server 110 may process and route HTTP requests (e.g., GET, POST, PUT, DELETE, etc.) sent by the digital rewards app 120 to services provided by the digital rewards system 108 and receipt processing system 104. The web server 110 may also transmit content (e.g., web data, image data, user data such as account information, rewards inventory, recorded transactions, and the like) to the digital rewards app 120 (or web browser 122).

The receipt processing system 104 is configured to obtain (e.g., from the client device 118 via the digital rewards app 120 or web browser 122 executing thereon) and process data indicative of a receipt created from a transaction between the user and a merchant. For example, the data may be embodied as an image of the receipt captured by a camera of the client device 110, a text-based document (e.g., a Portable Document File (PDF), a file formatted using some structured markup language, a JavaScript Object Notation (JSON) file, a plaintext file, a spreadsheet, an HTML file, etc.), a formatted stream of text, etc. The receipt processing system 104 may extract text components within the data, segment the text components, and classify the segmented data into predefined categories, such as retailer name, unique retailer identifier (e.g., a branch name, a store number, a platform-specific retailer ID, etc.), retailer address, retailer phone number, purchased item, purchased item category, purchased item quantity, purchased item price, tax, price, return policy, and so on. In some embodiments, the receipt processing system 104 may extract and categorize such information using OCR. The receipt processing system 104 may then transmit the extracted text and associated classifications to other components within the digital rewards platform 102, such as the entity resolution system 106 and digital reward system 108. The receipt processing system 104 may also store extracted receipt data and original receipt data (e.g., the scanned image file) in a data store maintained by the digital rewards platform 102, such as the receipt database 116.

The entity resolution system 106 is configured to map text identified by the receipt processing system 106 to an canonical retailer entity name that is stored by the digital rewards platform 102, such as in the entity name database 114. The entity name database 114 may comprise names of known retailer entities collected over time via various sources, wherein a given entry in the entity name database 114 may specify a primary entity name (e.g., "GUS'S GRILL") and also include known name variants (e.g., "GUSS GRILL", "GUS'S GRILL TN", "GUS'S GRILL #88"). Example sources can be from the platform 102 (e.g., historical use of the platform in resolving entities), a retailer entity submitting primary entity name and variant entity name data, collected from third-party sources (e.g., Internet sites maintaining retailer information, business directories, stock indexes, etc.). The entity name database 114 may be embodied as a lookup table, key value store, relational database, and so on. As further described herein, the entity resolution system 106 may train, deploy, and execute AI/ML-based models that take, as input (e.g., from the receipt processing system 104), raw text corresponding to an entity name identified in a receipt and match the raw text to an primary entity name stored in the entity name database 114, even if the entity name identified in the receipt is not a 1:1 match of the primary entity name or any of its known variants stored in the database 114 (e.g., a previously unknown variant "GUS'S GRILL ND").

The digital rewards system 108 is configured to manage rewards on the digital rewards platform 102. For example, the digital rewards system 108 may include account management processes for providing account details for customers and retailers, rewards promotion management processes for enforcing predefined parameters and rules for rewards promotions (e.g., promotion duration, limitations on rewards issuance, point multipliers for certain permissions), retailer restrictions management processes for enforcing predefined parameters and rules issued by the retailer (e.g., blackout periods, limitations on rewards issuance, location restrictions on earning rewards, etc.), distribution processes for issuing rewards to users based on purchases reflected in submitted receipts, processes for crediting purchases to a given retailer account, processes for crediting purchases to a given user account, and so on. The aforementioned processes may use the resolved retailer entity name data in a variety of manners, such as for crediting purchases to the appropriate retailer entity.

The user interface 112 may be embodied as any hardware, system, or circuitry configured to enable a user of the digital rewards platform 102 (e.g., a system administrator, engineer, developer, employee associated with the digital rewards platform 102, etc.) to access, manage, and configure components of the digital rewards platform 102. For example, the user interface 112 may be provided in a management console system executing as part of the digital rewards platform 102, or may be a module located in each one of the receipt processing system 104, entity resolution system 106, digital rewards system 108, and the web server 110.

Note, FIG. 1 depicts components of the digital rewards platform 102 as single components and systems for purposes of simplicity. In practice, the components of the digital rewards platform 102 may be arranged in a variety of configurations, such as a number of physical computing systems performing one or more processes of the entity resolution system 106. In addition, some processes performed by the receipt processing system 104, entity resolution system 106, digital rewards system 108, and web server 110 may be offloaded to or otherwise processed using one or more cloud computing systems and/or cloud computing resources (e.g., compute, memory, storage, etc.). For example, it may be more computationally efficient to perform some aspects of training or refining the underlying models of the entity resolution system 106 on cloud systems that have a considerable amount of resources to mitigate any computing impact on other processes conducted by the entity resolution system. Further, some aspects of training, executing, or refining the models may be performed by the client device 118 via the digital rewards app 120. In addition, the digital rewards platform 102 may include other systems and processes not shown in FIG. 1. In some embodiments, each of the receipt processing system 104, entity resolution system 106, digital rewards system 108, and web server 110 are embodied as a physical computing system (e.g., a desktop system, workstation, rack server), a virtual machine or container instance (e.g., executing on a cloud network), or some combination. In some embodiments, each of the receipt processing system 104, entity resolution system 106, and digital rewards system 108 may be implemented as microservices executing on one or more computing systems or virtual machine or container instances as part of a microservice architecture.

Figure 2:
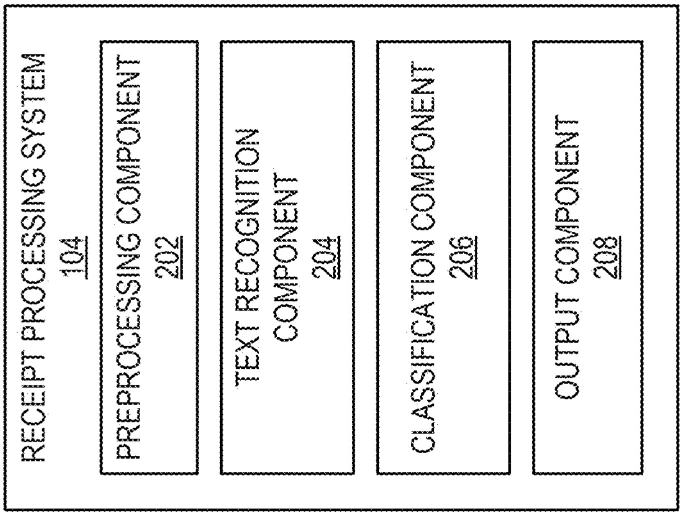
FIG. 2 illustrates an example receipt processing system of the digital rewards platform of FIG. 1 configured to process and recognize text in a document such as a retail receipt.

As stated, the entity resolution system 106 may receive, as input, raw text data that is extracted from an image and processed by the receipt processing system 104. Referring to FIG. 2, components of the receipt processing system 104 can include a preprocessing component 202, text recognition component 204, classification component 206, and output component 208. Each of the components 202, 204, 206, and 208 may be embodied as hardware, software, and/or circuitry for performing OCR, document understanding, and information extraction functions on an input receipt image.

The illustrative preprocessing component 202 is configured to retrieve an image (e.g., transmitted by a client device 118 to the platform 102) and format the image for text recognition. For example, the preprocessing component 202 may perform noise reduction techniques to eliminate or mitigate noise and other artifacts in the image that may hinder text recognition. The preprocessing component 202 may also align the image using skew correction techniques to correct any tilting of the underlying receipt (and accompanying text) captured in the image. The preprocessing component 202 may also perform segmentation to divide the image into regions where text is likely to be found.

The text recognition component 204 is configured to perform character detection and pattern recognition algorithms to identify text within the image following preprocessing. For example, the text recognition component 204 may apply AI/ML techniques (e.g., deep learning algorithms, convolutional neural networks (CNN)) for character detection, feature extraction, and text recognition.

The classification component 206 is configured to classify recognized text in the receipt image to a predefined receipt category (e.g., entity name, address, store identifier, phone number, item, etc.). In an embodiment, the classification component 206 may apply AI/ML techniques (e.g., CNNs, position-aware transformers, etc.) to classify, based on an identified spatial understanding of the recognized text relative to the position of the text in the receipt, the recognized text into a predefined category. For example, the classification component 206 may learn and recognize that text generally located towards a top portion of a receipt may correspond to retailer information such as entity name, address, and contact information, in which the entity name is typically listed first. Given this, the classification component 206 may classify the text to each of the predefined retailer information categories of entity name, address, and contact information (or similar).

The output component 208 is configured to transmit extracted raw text and classification to other components of the digital rewards platform 102, such as the entity resolution system 106, digital rewards system 108, receipt database 116, etc. For example, the output component 208 may generate a request for entity name resolution to the entity resolution system 106, in which the request incorporates the text string that was classified as an entity name.

Figure 3:
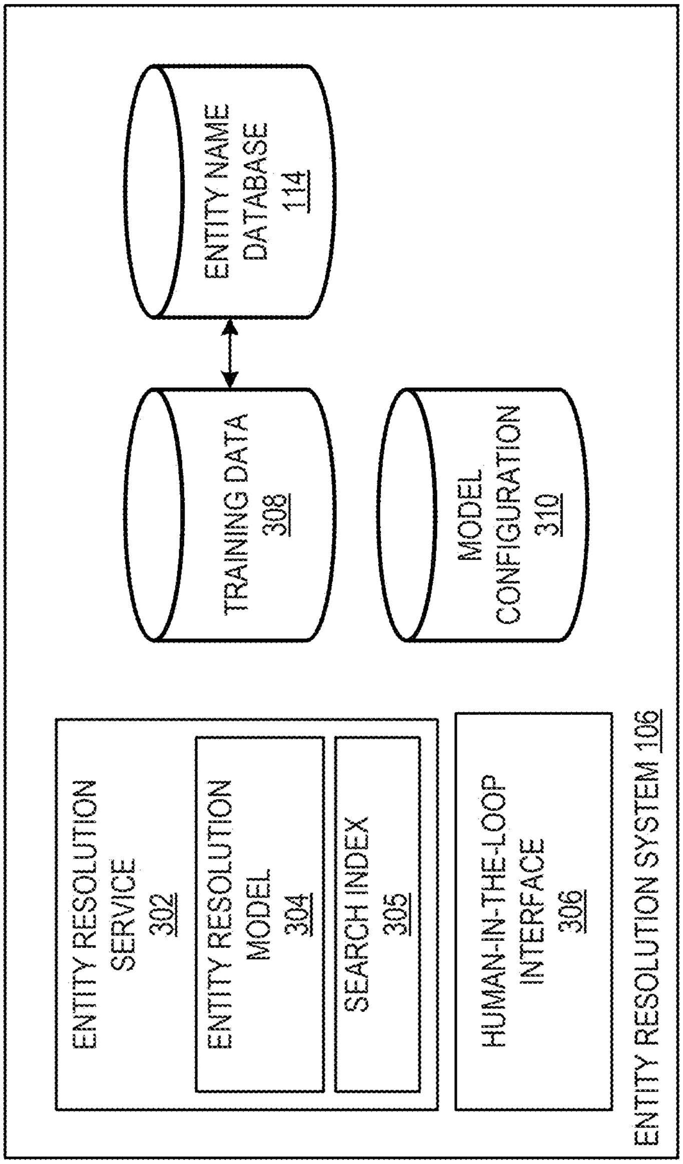
FIG. 3 illustrates an example entity resolution system of the digital rewards platform of FIG. 1 configured to learn semantics and conventions associated with a document such as a retail receipt for entity resolution.

Referring now to FIG. 3, components of the entity resolution system 106 can include an entity resolution service 302, a human-in-the-loop interface 306, training data 308, and model configuration 310. Each of the components 302 and 306 may be embodied as hardware, software, and/or circuitry for performing entity resolution functions in the digital rewards platform 102.

The illustrative entity resolution service 302 is configured to execute one or more entity resolution models 304 such that the entity resolution models 304 receive, as input, raw text indicative of an entity name on a receipt, identify (based on evaluation of a search index 305 generated during training and execution of the models 304) a corresponding canonical retailer entity name (e.g., as identified in a platform 102 database such as the entity name database 114), and output the corresponding canonical retailer entity name. In an embodiment, the entity resolution models 304 may comprise any type of AI or ML-based model that can be configured and optimized to learn semantics and conventions associated with entity names in the domain of receipts, such as semantic patterns, relationships, conventions associated with primary and variant entity names.

Examples of entity resolution models 304 that can be trained and used by the entity resolution system include models that can be used to embed values into a vector space. One such model includes pretrained sentence transformers, a type of deep neural network that generates a dense vector representation of a semantic space to enable an understanding of word relationships based on a distance between the words when "embedded" into the vector space, such that two embedded words that are of relatively short distance between one another are likely similar in meaning in the given domain. Some examples of pretrained sentence models that may be adapted for the techniques of the present disclosure are Bidirectional Encoder Representations from Transformers (BERT) models, Sentence-BERT (SBERT) models, and the like. Typical pretrained sentence transformers like SBERT are initially trained to identify relationships between words in natural language and are not adapted to domains involving visually-rich documents such as retail receipts. However, the entity resolution system 106 (or other computing system) may be configured to "retrain" the sentence transformers to learn semantics and conventions associated with retail receipts. Other examples of entity resolution models 304 that may adapt the technologies disclosed herein include neural networks (e.g., recurrent neural networks (RNNs), long short-term memory (LTSM) RNNs, etc.). The entity resolution models 304 may also be embodied as classification models (e.g., decision trees, boosted trees, logistic regression models, etc.).

More particularly, in an embodiment, the entity resolution system 106 may perform supervised fine-tuning of entity resolution models 304 using training data 308 that comprises text inputs representing canonical retailer entity names. To achieve learning of semantics and conventions associated with receipts, the training data 308 is preferably diverse in several aspects, such as in retailer type (e.g., big box retailers, mom and pop retailers, fast food restaurants, shopping kiosks, and so on), in geographical locations (which can affect how the entity name is represented on the receipt, as some receipts may include location in relative proximity to the entity name), in a type of Point-of-Sale (POS) system used to print a given receipt, and in entity name variants that can be caused by OCR error (e.g., font kerning causing text recognition algorithms to interpret two characters as a single character, noise artifacts in an underlying image causing a given character to be interpreted as a different character, poor resolution of the image causing a given character to be interpreted as a different character, etc.). The training data 308 should also preferably be of a size to enable the model to learn patterns from the input text data and generalize new or otherwise previously unknown entity names and variants. For example, in practice, 5,000 to 10,000 entries has shown to be effective for performance and accuracy, through other amounts may be contemplated. To build such diversity and size into the training data 308, data from a variety of sources may be included, such as the entity name database 114 to obtain canonical retailer entity names and variants, historical entity name data obtained over the course of the operation of the digital rewards platform 102, historical OCR error data obtained over the course of operation of the digital rewards platform 102, and so on. Further, synthetic data may be generated and incorporated into the training data 308 to augment the entity resolution model 304. In some embodiments, the synthetic data may be generated based on the pre-existing data collected by the digital rewards platform 102. For example, a computing system of the digital rewards platform 102 may evaluate patterns and relationships associated with entries in the pre-existing entity name database 114 and generate synthetic data therefrom. For instance, the computing system may alter one or more characters for a given entity name in the database 114, transpose characters, replace terms with natural language synonyms, and the like.

In an embodiment, the training data 308 may be annotated to direct supervised fine-tuning of the entity resolution model 304. For example, each entry in the training data 308 may include a first string value, a second string value, and a label. The first string value may represent an entity name extracted from a receipt, the second string value may indicate the canonical retailer entity name (i.e., the actual originating merchant associated with the receipt), and the label.

In training the entity resolution model 304 using the training data 308, the entity resolution model 304 may generate a dense, high-dimensional vector representation of retailer semantics in embeddings that convey mathematical structure onto text (e.g., such that an entity name like "GUS'S GRILL" is embedded as [0.21, 0.13, 0.22, . . . ] or some other vector). By representing text as a vector, the entity resolution system 106 may leverage properties inherent with vector operations for fast understanding and comparison of semantic relationships between different text sequences to identify the most relevant ones through dense retrieval.

The search index 305 represents an index structure that enables fast search and retrieval of entity names embedded in the model vector space. In an embodiment, the search index 305 is an Approximate Nearest Neighbor (ANN) search index built using an ANN algorithm such as Hierarchical Navigable Small World (HNSW) graphs or Locality-Sensitive Hashing (LSH). The entity resolution model 304 for entity resolution may embed a given text input of a receipt into the vector space and then use the search index 305 to identify the nearest neighbor embedding in the vector space in terms of a distance metric, which should correspond to the actual underlying entity associated with the receipt.

In an embodiment, the human-in-the-loop interface 306 is configured to provide an interface for a user (e.g., an evaluator, administrator, developer, or some other user accessing a user interface 112) to verify accuracy of outputs by the model 304 during training and execution of the model 304. The interface 306 may provide a given output entity name and information associated with the underlying receipt (e.g., an image scan of the receipt) for presentation on a display, such as through the user interface 112. The interface 306 may then prompt the user to review the output entity name and verify whether the output is correct (i.e., the output matches the originating merchant on the presented receipt) and provide an actual entity name in the event that the output is not correct. For example, the model may output an incorrect entity name if OCR error causes text recognition algorithms to interpret a word in the name incorrectly (e.g., text in a receipt that reads as "GUS'S GRILL" is interpreted as "GUFF GRIII" by the text recognition algorithm). As another example, the entity name presented in the receipt might be a new or previously unknown retailer entity to the digital rewards platform 102 (e.g., no records of the entity are stored in the entity name database 114). As yet another example, the entity name string may include a variant unrecognized by the model which may have deviated in pattern from other variants. The model 304 may use corrected outputs from the user in retraining or refinement.

In some embodiments, the entity resolution model 304 selectively transmits output to the human-in-the-loop interface 306 (as opposed to transmitting all outputs). For example, the outputs may be transmitted randomly or at predefined iterations (e.g., every five outputs, every 100 outputs, etc.) to streamline spot-checking by the user, which can be advantageous during initial training of the model 304. The entity resolution model 304 may also selectively transmit outputs based on a threshold confidence score. A confidence score may be generated by the model 304 for each output and may represent the likelihood that the output actually matches the underlying entity associated with the receipt. In an embodiment, the confidence score may be generated based on a similarity between the associated embeddings (i.e., the embedded input and the resulting output), which can be determined by a distance measure between the embeddings in the vector space.

In an embodiment, the model configuration 310 may include one or more tunable parameters associated with training and executing the AI/ML models 304. For example, the model configuration 310 may allow a user to define thresholds for confidence scores. Other examples for model configuration 310 can include a number of transformer layers (e.g., a greater number of layers may increase the ability of the model to learn contextual relationships, at some computational expense), training parameters (e.g., batch size, learning rate, loss functions), evaluation parameters, and so on.

Figure 4:
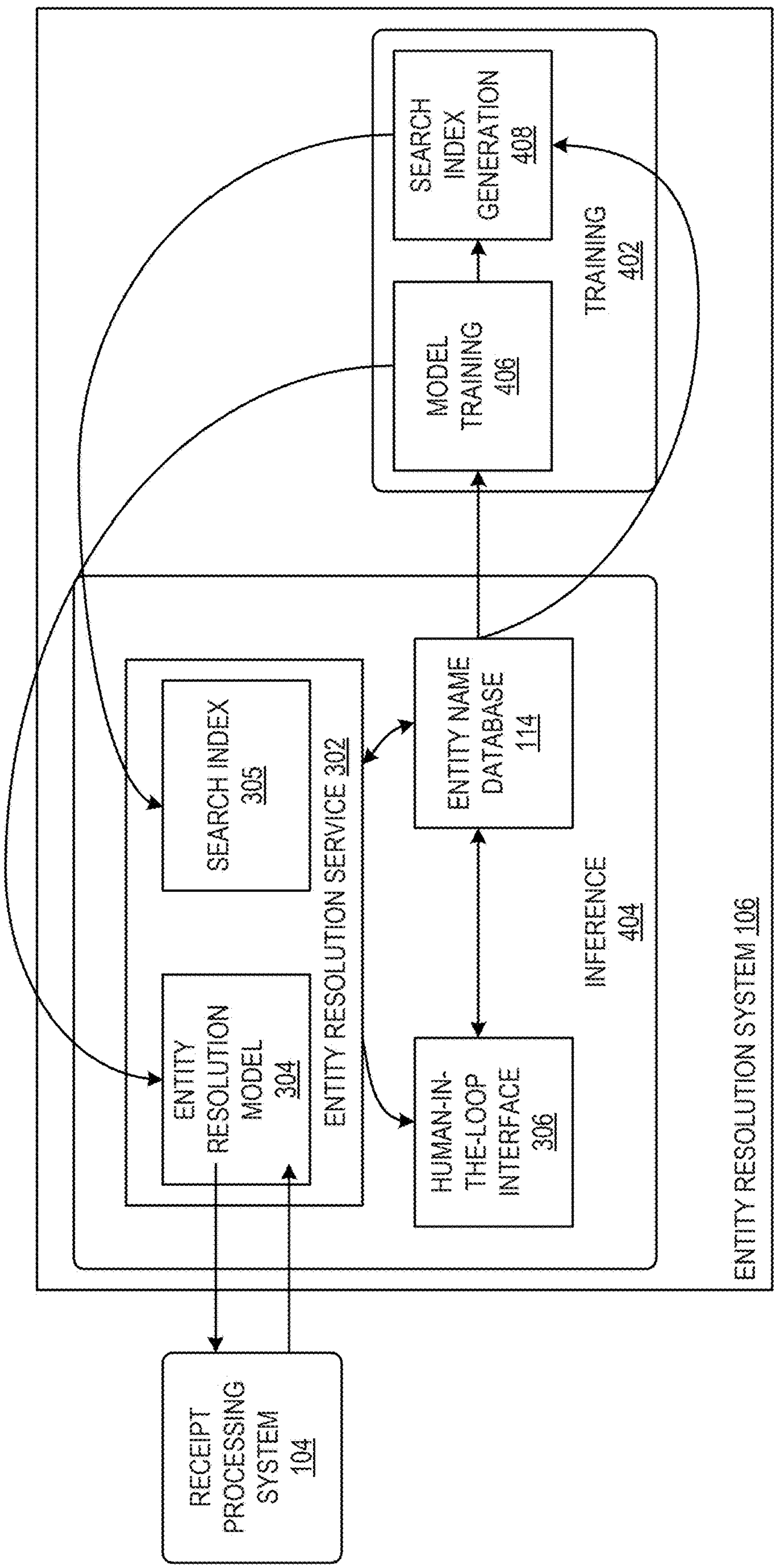
FIG. 4 illustrates a conceptual diagram of interaction between components of the digital rewards platform of FIG. 1.

FIG. 4 depicts a conceptual diagram of interactions between the receipt processing system 104 and the entity resolution system 106 in operation for training the entity resolution model 304, conducting online inference of the model 304, and providing active feedback on model 304 outputs through the human-in-the-loop interface 306.

The entity resolution system 106 may perform training 402 and inference 404 on the entity resolution model 304. The training 402 process comprises at least training the entity resolution model 304 (at 406), e.g., based on supervised fine-tuning of the model 304 on the training data 308, and building the search index 305 (at 408), in which each embedded text input from the training data 308 (which is collected, at least in part, from entity name data) is indexed in a search data structure using ANN techniques. The model training 406 and the search index generation 408 processes are described in further detail relative to FIG. 6. Although FIG. 4 depicts the training 402 as being conducted by the entity resolution system 106, the training 402 may be performed on a separate computing system, such as an offline physical computing system (or virtual computing instance) of the digital rewards platform 102.

The entity resolution system 106, upon training the model 304, may deploy the entity resolution model 304 for execution and online inference 404. For example, the entity resolution system 106 may load the model 304 and search index 305 thereon (or some separate computing system, such as a computing node in a cloud network associated with the digital rewards platform 102) and couple the model 304 and search index 305 with the entity resolution service 302. In an embodiment, the entity resolution service 302 may be communicatively coupled with the receipt processing system 104 and serve requests sent by the receipt processing system 104 to resolve an entity name (e.g., interpreted from a receipt image). For example, a request may be formatted such that a text string corresponding to an entity name to be resolved is included therein. The entity resolution service 302, upon receiving the request, may input the text string into the model 304, which may identify (to an objective measure of confidence) the canonical entity name, e.g., based on embedding the input string in the model vector space and determining a similarity measure to a nearest neighbor embedding using the search index 305. The entity resolution service 302 may transmit the model 304 outputs (e.g., the output entity name and a confidence score) to the receipt processing system 104. The entity resolution service 302 may also transmit outputs to the human-in-the-loop interface 306 (e.g., in the event that the confidence score is below a specified threshold) and/or the entity name database 114 (e.g., to add new entity names and/or variants therein). The inference 404 processes are described in further detail relative to FIG. 7, and the human-in-the-loop interface 306 processes are described in further detail relative to FIG. 8.

Figure 5:
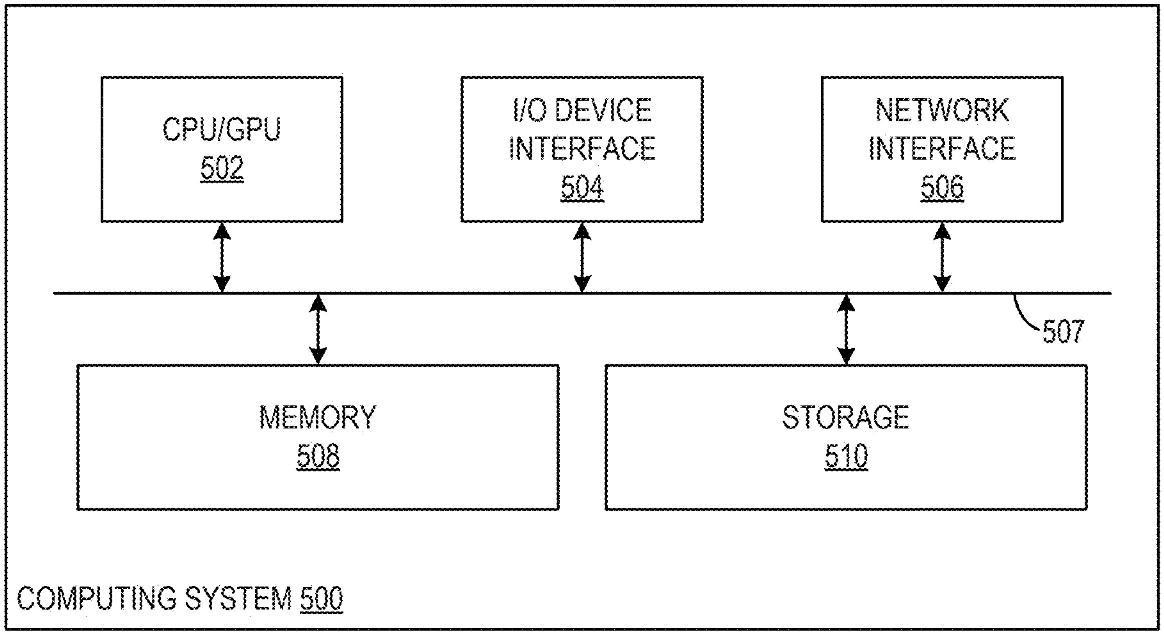
FIG. 5 illustrates an example computing system configured to perform functions of the digital rewards platform of FIG. 1.

FIG. 5 further illustrates an example computing system 500 of the digital rewards platform 102. The computing system 500 may carry out one or more of the functions of the components of the digital rewards platform 102, such as the receipt processing system 104, entity resolution system 106, digital rewards system 108, web server 110, and user interface 112. The computing system 500 may also serve as a store for data managed by the digital rewards platform 102, such as the entity name database 114, receipt database 116, training data 308, and model configuration 310.

As shown, computing system 500 includes, without limitation, a central processing unit (CPU)/graphical processing unit (GPU) 502, an input/output (I/O) device interface 504, a network interface 506, a memory 508, and a storage 510, each interconnected via a hardware bus 517. Of course, the actual computing system 500 will include a variety of additional hardware components not shown. Additionally, in some embodiments, one or more of the illustrative components may be incorporated in, or otherwise form a portion of, another component.

The CPU/GPU 502 retrieves and executes programming instructions stored in the memory 508. The CPU/GPU 502 may be embodied as one or more processors, each processor being a type capable of performing the functions described herein. For example, the CPU/GPU 502 may be embodied as a single or multi-core processor(s), a microcontroller, or other processor or processing/controlling circuit. In some embodiments, the CPU/GPU 502 may be embodied as, include, or be coupled to a field programmable gate array (FPGA), an application-specific integrated circuit (ASIC), reconfigurable hardware or hardware circuitry, or other specialized hardware to facilitate performance of the functions described herein. The hardware bus 507 is used to transmit instructions and data between the CPU/GPU 502, storage 510, network interface 506, and the memory 508.

The network interface 506 may be embodied as any hardware, software, or circuitry (e.g., a network interface card) used to connect the computing system 500 over the network 120 (and/or internal networks within the digital rewards platform 102) and provide network communication functions. For example, the network interface 506 may be embodied as any communication circuit, device, or collection thereof, capable of enabling communications over the network 120 between the computing system 500 and other devices. The network interface 506 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication. For example, to do so, the network interface 506 may include a network interface controller (NIC, not shown), embodied as one or more add-in-boards, daughtercards, controller chips, chipsets, or other devices that may be used by the computing system 500 for network communications with remote devices. For example, the NIC may be embodied as an expansion card coupled to the I/O device interface 504 over an expansion bus such as PCI Express.

The I/O device interface 504 allows I/O devices (e.g., keyboards, mice, printers, scanners, touchscreens, audiovisual devices, etc.) to communicate with hardware and software components of the computing system 500. For example, the I/O device interface 504 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O device interface 504 may form a portion of a system-on-a-chip (SoC) and be incorporated, along with one or more of the CPU/GPU 502, the memory 508, and other components of the computing system 500.

The memory 508 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

The storage 510 may be embodied as any type of devices configured for short-term or long-term storage of data such as, for example, memory devices and circuits, memory cards, hard disk drives (HDDs), solid-state drives (SSDs), or other data storage devices. The storage 510 may include a system partition that stores data and firmware code for the storage 510. The storage 510 may also include an operating system partition that stores data files and executables for an operating system.

Figure 6:
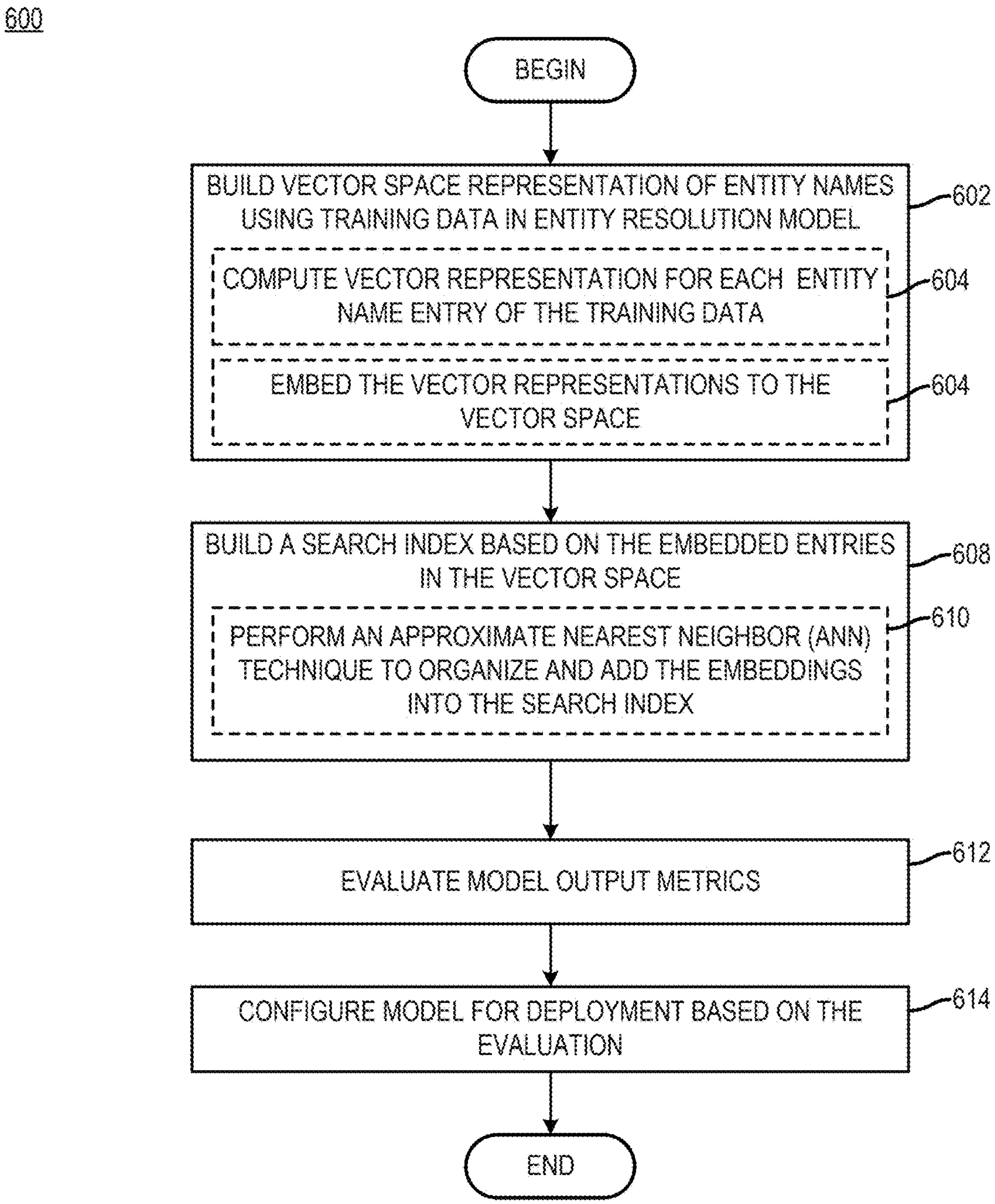
FIG. 6 illustrates a flow diagram of an example method for adapting a pre-trained entity resolution model to a retail entity domain.

Referring now to FIG. 6, the entity resolution system 106, in operation, may perform a method 600 for training the entity resolution model 304 by adapting a pretrained model (e.g., a sentence transformer model or some other adaptable model such as other pretrained models or neural networks) to an entity domain associated with retail receipts. Although the method 600 is described as being performed by the entity resolution system 106, the method 600 may be performed, in part or in entirety, by other computing systems, software services, and components associated with the digital rewards platform 102.

As shown, the method 600 begins in block 602, in which the entity resolution system 106, via the model 304, builds a high-dimensional vector space representation of canonical entity names to be used by the entity resolution model 304. For example, the entity resolution system 106 does so by using training data (e.g., training data 308) that incorporates, at least in part, historical resolved retailer entity names of the digital rewards platform 102 (stored in the entity name database 114) and is annotated such that each training data 308 input may include a pair of text strings (e.g., a text input entity name representing an entity name scanned from a receipt image and a canonical entity name) and a label that indicates a relation between each string in the pair, such as a similarity metric. For example, the label may correspond to a binary value (e.g., in which a value of 1 indicates that the each string in the pair is identical and a value of 0 indicates that the strings differ). As another example, a soft similarity metric may be applied to return a probability measure of the likelihood that the strings correspond to the same entity. In some cases, such as for a training data 308 entry that represents a canonical retailer name, each text string in the entity pair may have an identical value.

Upon initializing the vector space, the entity resolution system 106, via the model 304, can embed a vector representation of the entity name text inputs from the training data 308 to the vector space. For instance, in block 604, the entity resolution system 106, via the model 304, may compute a vector representation of the text input entity name. The model 304 may adjust the computed vector representation to be nearer in the vector space to the canonical retailer entity (e.g., specified in the respective training data 308 entry), which will indicate that the input entity name and the canonical retailer entity may be related contextually, even if certain words between each name may differ. For example, assume a restaurant retailer entity named "GUS'S GRILL" also operates as "GUS'S TO GO" in other markets. Also assume that a completely different entity operates under the name "GUS'S TRAVEL." In this example, although "TO GO" may be more similar in meaning to "TRAVEL" under natural language conventions compared to "GRILL," "GUS'S TO GO" should be positioned nearer to "GUS'S GRILL" and further from "GUS'S TRAVEL" in the vector space given the retailer context. In block 606, the entity resolution system 106, via the model 304, embeds the computed vector representations into the vector space.

In block 608, the entity resolution system 106 builds a search index (e.g., the search index 305) from the embeddings produced in steps 602-604. As stated, an ANN technique such as HNSW or LSH can be used to do so. In block 610, the entity resolution system 106, via the model 304, performs the ANN technique to organize and add the embeddings into the search index 305, for efficient retrieval of a nearest neighbor embedding based on a similarity search. For example, the model 304 may insert the vector embeddings into a HNSW graph and connect vectors based on proximity. A query vector may thereafter be used to traverse the graph to identify the nearest neighbor vector embedding that corresponds to an entity name.

In block 612, the entity resolution system 106 may evaluate the model output metrics to ensure that the model 304 is in condition for deployment. For example, the entity resolution system 106 may assess a variety of metrics such as precision, recall, F1 score, and Area Under the Precision-Recall Curve (AUC-PR curve). For example, the aforementioned metrics enable the assessment of false positive and negative outputs generated by the model 304, which can thereafter be used to determine whether additional fine-tuning or reconfiguration of model 304 parameters might be warranted. Further, additional training data may be provided to evaluate whether the model 304 is capable of generalizing unknown entities. In block 614, the entity resolution system 106 may further configure the model 304 based on the evaluation, such as by adjusting thresholds for confidence scores, adjusting distances between given embeddings, and setting conditions for forwarding outputs to the human-in-the-loop interface 306.

Figure 7:
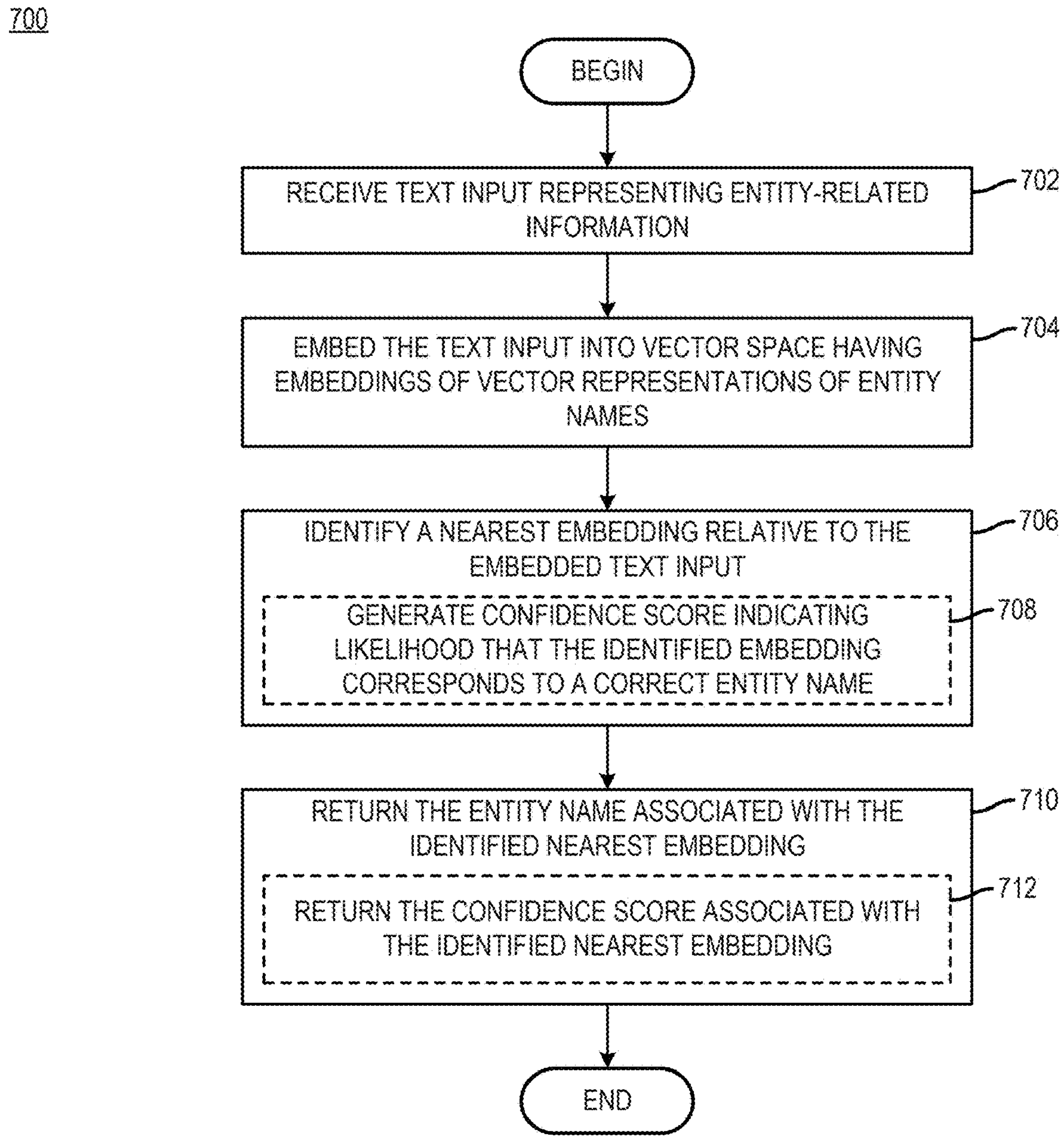
FIG. 7 illustrates a flow diagram of an example method for processing a request to identify an entity name using the entity resolution system of FIG. 3.

As stated, the trained model 304 may be deployed (e.g., to a server executing on a cloud provider network associated with the digital rewards platform 102, to a service hosted by the entity resolution system 106, etc.) for use in determining an underlying entity name associated with an originating merchant of a receipt. Referring now to FIG. 7, the entity resolution system 106, in operation, may perform a method 700 for processing a request to resolve an entity name.

As shown, the method 700 begins in block 702, in which the entity resolution system 106, via the model 305 receives text input representing entity-related information, such as a string having a value corresponding to an entity name. The text input can be received as part of a request sent by the receipt processing system 104 of the digital rewards platform 102 to the entity resolution service 302 as part of a workflow to obtain the correct entity name printed on a receipt by a retailer (e.g., an image of which may have been submitted by a user of the platform 102 through a client device 118 following a purchase from the retailer). In block 704, the entity resolution system 106, via the model 304, embeds the text input into the vector space of entity name embeddings. To do so, the entity resolution system 106, via the model 304, may compute a vector representation of the text input and add the embedding to the vector space.

Once embedded, in block 706, the entity resolution system 106, via the model 304, may identify a nearest embedding of an entity name vector representation relative to the embedded text input. For example, to do so, the entity resolution system 106, via the model 304, may use the computed vector representation of the text input as a query vector into a search algorithm to traverse the search index 305, which results in the nearest embedding to be returned by the search algorithm. In block 708, the entity resolution system 106, via the model 304, may generate a confidence score indicating a likelihood that the identified embedding corresponds to the correct entity name (i.e., the originating merchant in the receipt).

In block 710, the entity resolution system 106, via model 304, may return the entity name associated with the identified nearest embedding to the receipt processing system 104, which enables the receipt processing system 104 to associate the underlying receipt and contents thereof to the appropriate retailer entity. Further, in block 712, the entity resolution system 106 may also transmit the generated confidence score associated with the identified nearest embedding. The model 304 may also transmit the entity name to the entity name database 114, e.g., in the event that the text input initially received by the receipt processing system 104 is a previously unknown variant of a canonical retailer entity stored in the database 112.

Figure 8:
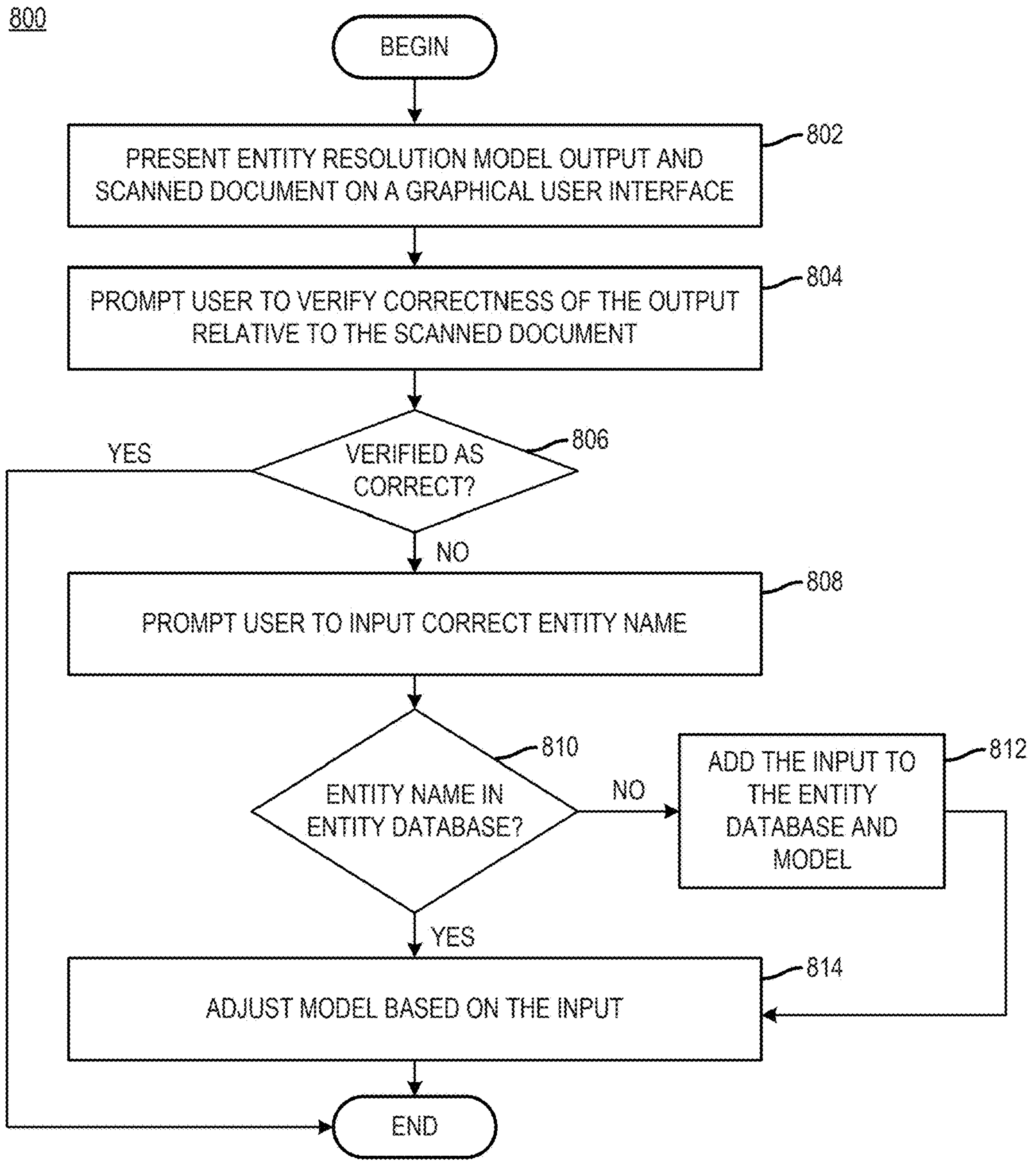
FIG. 8 illustrates a flow diagram of an example method for performing active learning on an entity resolution model using a human-in-the-loop interface.

In some embodiments, the model 304 may also return the entity name and confidence score to the human-in-the-loop interface 306 for further evaluation (e.g., in the event that the generated confidence score falls below a threshold, at random, etc.). Referring now to FIG. 8, the entity resolution system 106, in operation, may perform a method 800 for using the human-in-loop interface 306 to perform active learning on the entity resolution model 306. As shown, the method 800 begins in block 802, in which the entity resolution system 106, via the human-in-the-loop interface 306, presents an output of the model 304 and corresponding scanned document to a graphical user interface (e.g., via a user interface 112).

Figure 9A:
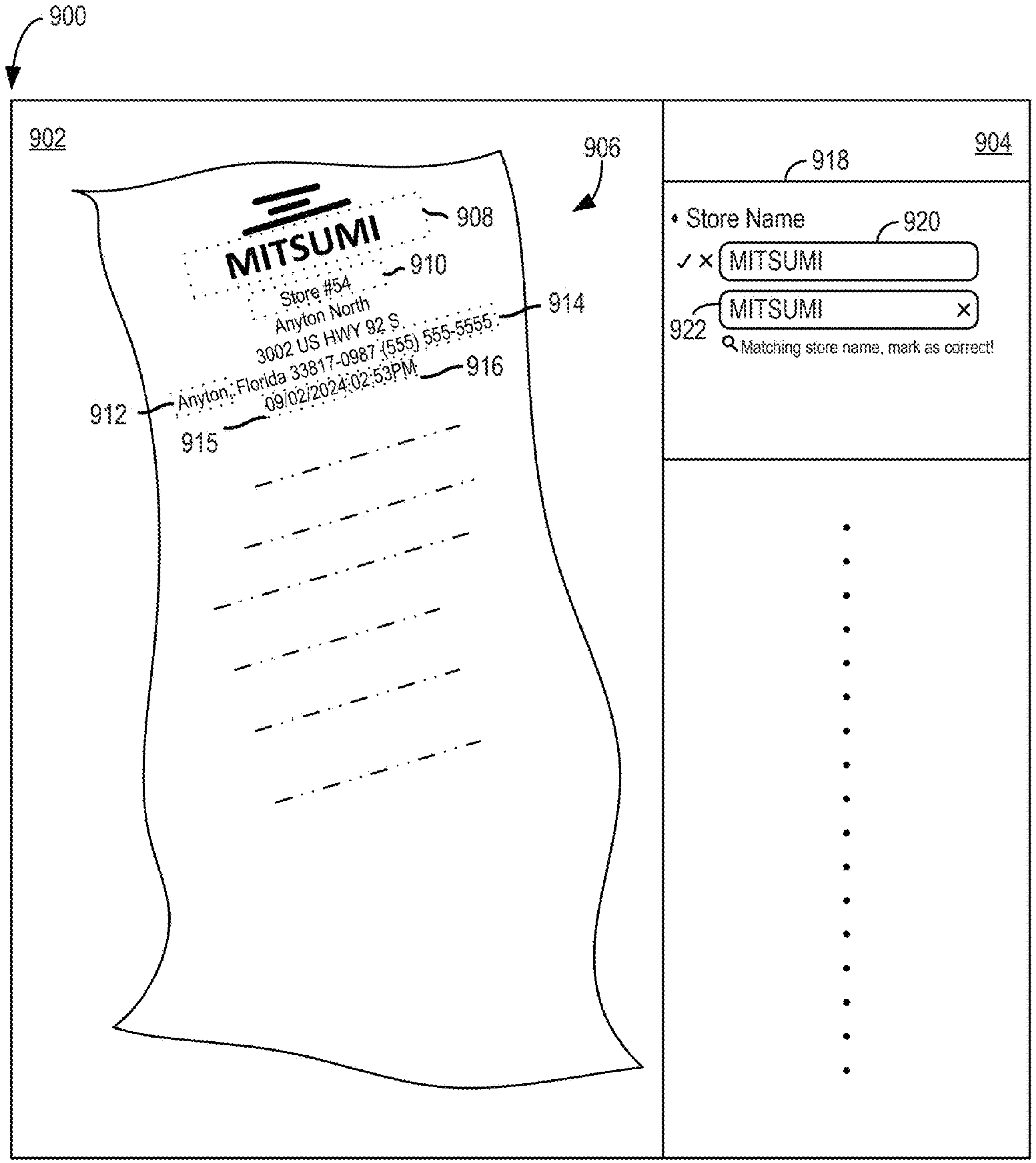
FIGS. 9A and 9B illustrate depictions of example graphical user interfaces for evaluating entity resolution model outputs.

For example, FIG. 9A presents an example graphical user interface 900 that may be rendered on a display of an evaluator user assigned to review outputs of the model 304. Panel 902 provides an image display depicting a receipt 906. Assume that the image displayed in panel 902 is submitted by a client user (e.g., via a client device 118). The panel 902 may also highlight (as depicted by the rectangular bounding boxes with dotted outlining) portions of the receipt that have been segmented and classified by the receipt processing system 104, such as store name box 908, store number 910, city 912, store phone number 914, transaction date 915, and transaction time 916. The graphical user interface 900 also provides a review panel 904 displaying graphical elements for reviewing the values for each classified text item from the receipt 906. For simplicity, only the store name verification element 918 is shown in this example.

Returning to FIG. 8, in block 804, the entity resolution system 106, via the human-in-the-loop interface 306, prompts the evaluator user to verify the correctness of the model 304 output relative to the scanned document. Continuing the example, the store name verification element 918 lists the scanned text 920 as "MITSUMI" (which is provided as text input to the model 304) and the corresponding entity name 922 "MITSUMI" identified and output by the model 304. The evaluator user may review the values and confirm whether the entity name 922 is correct (e.g., by clicking the checkmark to verify or the x-mark to reject). In block 806, the entity resolution system 106, via the human-in-the-loop interface 306, receives and reviews the evaluator input on whether the entity name 922 is correct. If so, then the human-in-the-loop interface 306 may send an indication to the model 304 verifying the output. As an evaluator user audits the accuracy of the model 304, the user can select the pre-populated entity name 922 if correct.

However, if the evaluator user rejects the entity name output by the model 304, then in 808, the entity resolution system 106, via the human-in-the-loop interface 306, may prompt the user to input the correct entity name. In block 810, the entity resolution system 106, via the human-in-the-loop interface 306, evaluates the entity name and determines whether the entity name is in the database. If not, then in block 812, the entity resolution system 106, via the human-in-the-loop interface 306, may add the entity name input by the evaluator user to the entity database 112, as well as submit to the model 304 for embedding to the vector space and indexing. If the entity name is already in the entity name database 114, then in block 814, the entity resolution system 106 may adjust the model 304 based on the input. For example, the similarity measure between the entity name input by the evaluator user and the initial scanned text input may be adjusted such that the respective embeddings are nearer in vector space.

As an evaluator user audits the accuracy of the model 304, the user can select the pre-populated entity name 922 if correct. However, due to various conventions and variants, it is important to enforce consistency during the review process. The human-in-the-loop interface 306 may leverage the retailer understanding of the model 304 and perform efficient AI-driven validation. For instance, the evaluator user can interpret a "correct" store name in a variety of ways. As an example, the receipt for a retailer that goes by "MITSUMI" may nevertheless print, on a receipt, "MITSUMI ANYTON", "MITSUMI #54", or "MITSUMI GALLERIA", depending on the location, and for business and data efficiency reasons, the model 304 should output the canonical entity name "MITSUMI" each time, and similarly, and evaluator user should also specify "MITSUMI" when reviewing potential variants.

Figure 9B:
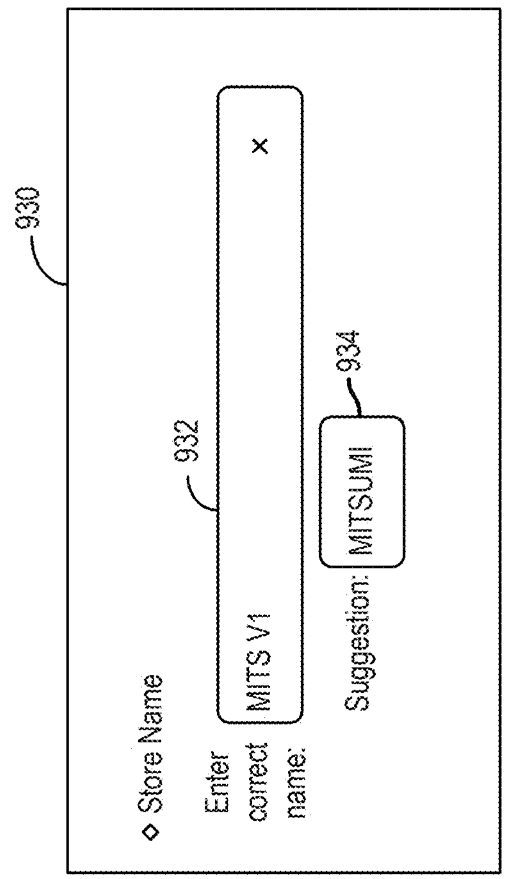

In an embodiment, the entity resolution system 106, via the human-in-the-loop interface 306, may guide an evaluator user to provide the canonical entity name (as stored in the entity database 112). Referring now to FIG. 9B, graphical user interface element 930 (which may be displayed on the graphical user interface 900, such as in the panel 904) providing a search-as-you-type feature in which an evaluator user is prompted to enter the correct entity name. In this example, the element 930 prepopulates an input text field 932 (for the evaluator user to provide a correct entity name) with the raw text "MITSNV1" identified by the receipt processing system 104. Assume that "MITSNV1" is not currently stored in the entity name database 114 (and thus the model 304 would not accurately identify the name).

The element 930 also provides a suggestion 934 indicative of the nearest canonical retailer name to the raw text (or to the text input provided by the evaluator user) identified by the model 304. Doing so ensures that if a new retailer entity is flagged by the model 304 and human-in-the-loop interface 306, it is not just a previously unrecorded variant of a preexisting retailer entity in the entity name database 114. In this example, the suggestion 934 identifies "MITSUMI," which is a different retailer. The interface, in providing the suggestion, guides the user to select the suggestion over other possible variations on "MITSUMI" that the evaluator user might enter, such as "MITSUMI CORPORATION" or "MITSUMI STORE". Advantageously, the human-in-the-loop interface 306 discourages or prevents adding duplicates of canonical entities and reduces the rate of false positives added to the entity name database 114 by an evaluator user. If the user confirms that there is no suggestion which matches the retailer entity name (per the receipt image), the entity resolution system 106 may automatically detect that there is a new retailer entity to be added to the entity name database 114 and model 304. Once added, the entity resolution system 104 may surface the newly added entity information to ensure any subsequently input variants are identified and mapped to the added entity name.

Figure 10:
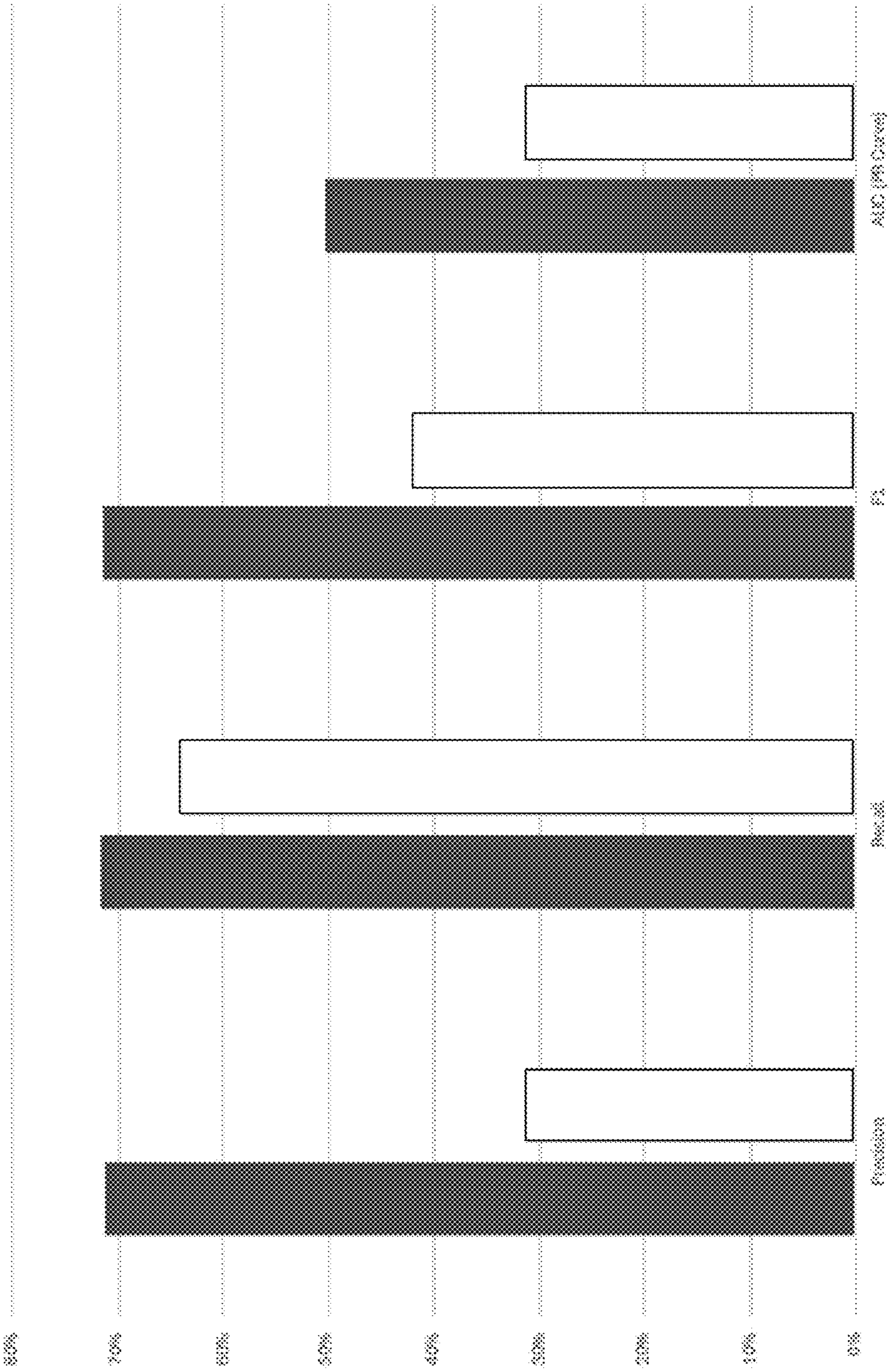
FIG. 10 illustrates bar graphs comparing performance of the entity resolution model of the present disclosure with performance of prior art methodologies.

Referring now to FIG. 10, a bar graph 1000 demonstrating the performance advantages of the entity resolution model 304 over a prior model (a pretrained sentence transformer) under several metrics, particularly: precision, recall, F1 score, and AUC-PR curve, in which the solid colored bars indicate the performance of the entity resolution model 304 under these metrics and the unfilled bars indicate the performance of the prior art model under these metrics. Each of the metrics enable evaluation of how often each model is correctly and incorrectly predicting outputs in response to an input receipt.

For this demonstration, each of the entity resolution model 304 and the prior art model evaluated approximately 4,075 receipts (which were scanned into the digital rewards platform 102 and manually evaluated to establish the correct canonical retailer in the underlying receipts). As shown, the entity resolution model 304 clearly outperforms the prior art model for each of these metrics. For instance, recall, which measures the ability of the model to identify all data points in a relevant class (subject to a specified threshold), is greater in the model 304 (over 70%) than the prior art model (approximately 63%). Precision, which measures the ability of a model to return only the data points in a relevant class (subject to a specified threshold), is greater in the model 304 (over 70%) than the prior art model (approximately 31%). The F1 score, which is the harmonic mean of precision and recall, is measured at over 70% for the model 304 and approximately 42% for the prior art model. The AUC-PR curve, which is a hybrid-based metric using precision and recall across all thresholds, is measured at over 60% in model 304 and slightly over 30% for the prior art model.

While the foregoing is directed to embodiments of the present disclosure, other and further embodiments of the disclosure may be devised without departing from the basic scope thereof, and the scope thereof may be determined by the example claims that follow.

We claim:

1. A computer-implemented method for matching text input to a retailer entity name in a receipt, comprising:

collecting data for training an entity resolution model initially trained on a first domain to learn semantic relationships associated with entity names provided in a domain of retailer receipts, wherein the data for training the entity resolution model includes a plurality of entries, each entry specifying at least a retailer entity name and a label describing a measure associated with the retailer entity name;

building the entity resolution model using the collected data by performing a supervised learning technique to adapt the entity resolution model to learn and generalize the semantic relationships;

deploying the entity resolution model to serve requests for resolving an entity name from text extracted from a retailer receipt; and providing an active learning interface to refine the entity resolution model.

2. The computer-implemented method of claim 1, wherein performing the supervised learning technique comprises:

initializing a high-dimensional vector space;

for each entry in the plurality of entries, computing a vector representation of the retailer entity name; and embedding the computed vector representations to the vector space.

3. The computer-implemented method of claim 2, further comprising:

generating a search index based on the embedding of the computed vector representations.

4. The computer-implemented method of claim 3, wherein generating the search index comprises performing an approximate nearest neighbor (ANN) technique to organize the embedded computed vector representations into the search index.

5. The computer-implemented method of claim 4, further comprising:

receiving, by the entity resolution model, a request to resolve a raw text extracted from an input retailer receipt;

computing a vector representation of the raw text extracted from the input retailer receipt;

embedding the computed vector representation of the raw text extracted from the input retailer receipt to the vector space;

performing the ANN technique to identify a nearest neighbor embedding to the embedded computed vector representation of the raw text extracted from the input retailer receipt in the search index; and returning an entity name associated with the identified nearest neighbor embedding.

6. The computer-implemented method of claim 5, further comprising:

generating a confidence score associated with the returned entity name; and invoking the active learning interface in response to determining that the confidence score falls below a specified threshold.

7. The computer-implemented method of claim 6, wherein the active learning interface prompts a user to verify that the returned entity name corresponds to a canonical entity name associated with the input retailer receipt.

8. The computer-implemented method of claim 1, wherein the at least one of the plurality of entries of the collected data comprises a variant of the retailer entity name.

9. The computer-implemented method of claim 8, wherein the variant corresponds to an inaccurate text recognition of the retailer entity name.

10. The computer-implemented method of claim 1, wherein each entry specifies a first entity name, a second entity name, and a label, wherein the first entity name represents a canonical entity name, and wherein the label indicates whether the first entity name matches the second entity name.

11. The computer-implemented method of claim 1, wherein the semantic relationships of the first domain differ from the semantic relationships of the domain associated with retailer receipts.

12. A computer-implemented method for matching text input to an entity name in a document image, comprising:

collecting data for training an entity resolution model to learn semantic relationships associated with entity names provided in a domain of documents that follow semantic conventions differently from natural language semantic conventions, wherein the data for training the entity resolution model includes a plurality of entries, each entry specifying at least an entity name and a label describing a measure associated with the entity name;

training the entity resolution model using the collected data to learn and generalize the semantic relationships; and deploying the entity resolution model to serve requests for resolving an entity name from text extracted from a document image.

13. The computer-implemented method of claim 12, wherein training the entity resolution model comprises performing a supervised learning technique to adapt the entity resolution model to learn and generalize the semantic relationships.

14. The computer-implemented method of claim 13, wherein performing the supervised learning technique comprises:

initializing a high-dimensional vector space;

for each entry in the plurality of entries, computing a vector representation of the retailer entity name; and embedding the computed vector representations to the vector space.

15. The computer-implemented method of claim 14, further comprising generating a search index based on the embedding of the computed vector representations using an ANN technique.

16. The computer-implemented method of claim 15, further comprising:

receiving, by the entity resolution model, a request to resolve a raw text extracted from an input scanned document, the raw text corresponding to an input entity name;

computing a vector representation of the input entity name extracted from the input document image;

embedding the computed vector representation of the input entity name to the vector space;

performing the ANN technique to identify a nearest neighbor embedding to the embedded computed vector representation of the input entity name in the search index; and returning an entity name associated with the identified nearest neighbor embedding.

17. The computer-implemented method of claim 16, further comprising:

generating a confidence score associated with the returned entity name; and invoking the active learning interface in response to determining that the confidence score falls below a specified threshold, wherein the active learning interface prompts a user to verify that the returned entity name corresponds to a canonical entity name associated with the input document image.

18. A system, comprising:

one or more processors, and a memory storing a plurality of instructions, which, when executed by the one or more processors, causes the system to:

collect data for training an entity resolution model to learn semantic relationships associated with entity names provided in a domain of documents that follow semantic conventions differently from natural language semantic conventions, wherein the data for training the entity resolution model includes a plurality of entries, each entry specifying at least an entity name and a label describing a measure associated with the entity name;

train the entity resolution model using the collected data to learn and generalize the semantic relationships; and deploy the entity resolution model to serve requests for resolving an entity name from text extracted from a document image.

19. The system of claim 18, wherein training the entity resolution model comprises to perform a supervised learning technique to adapt the entity resolution model to learn and generalize the semantic relationships by:

initializing a high-dimensional vector space;

for each entry in the plurality of entries, computing a vector representation of the retailer entity name;

embedding the computed vector representations to the vector space; and generating a search index based on the embedding of the computed vector representations using an ANN technique.

20. The system of claim 19, wherein the plurality of instructions further causes the system to:

receive, by the entity resolution model, a request to resolve a raw text extracted from an input scanned document, the raw text corresponding to an input entity name;

compute a vector representation of the input entity name extracted from the input document image;

embed the computed vector representation of the input entity name to the vector space;

perform the ANN technique to identify a nearest neighbor embedding to the embedded computed vector representation of the input entity name;

return an entity name associated with the identified nearest neighbor embedding;

generate a confidence score associated with the returned entity name; and invoke the active learning interface in response to determining that the confidence score falls below a specified threshold, wherein the active learning interface prompts a user to verify that the returned entity name corresponds to a canonical entity name associated with the input document image.

* * * * *